(12) United States Patent
Guerret et al.

(10) Patent No.: US 7,767,757 B2
(45) Date of Patent: *Aug. 3, 2010

(54) THERMOSET MATERIALS WITH IMPROVED IMPACT RESISTANCE

(75) Inventors: Olivier Guerret, La Tour de Salvagny (FR); Pierre Gerard, Denguin (FR); Jean-Pierre Pascault, Villeurbanne (FR); Anthony Bonnet, Beaumont le Roger (FR)

(73) Assignee: Arkema France, Colombes (FR)

( * ) Notice: Subject to any disclaimer, the term of this patent is extended or adjusted under 35 U.S.C. 154(b) by 284 days.

This patent is subject to a terminal disclaimer.

(21) Appl. No.: 11/813,799

(22) PCT Filed: Jan. 18, 2006

(86) PCT No.: PCT/EP2006/000564
§ 371 (c)(1),
(2), (4) Date: Jul. 12, 2007

(87) PCT Pub. No.: WO2006/077153
PCT Pub. Date: Jul. 27, 2006

(65) Prior Publication Data
US 2008/0051511 A1  Feb. 28, 2008

Related U.S. Application Data

(60) Provisional application No. 60/664,137, filed on Mar. 22, 2005.

(30) Foreign Application Priority Data

Jan. 20, 2005  (FR) .................................. 05 00572
Mar. 24, 2005  (FR) .................................. 05 02911

(51) Int. Cl.
*C08L 53/00* (2006.01)
*C08L 63/00* (2006.01)
*C08F 297/00* (2006.01)
*C08F 293/00* (2006.01)

(52) U.S. Cl. ..................... 525/88; 525/92 R; 525/92 H; 525/93

(58) Field of Classification Search ................... 525/88, 525/92 R, 93, 98, 99, 92 H
See application file for complete search history.

(56) References Cited

U.S. PATENT DOCUMENTS

| 5,869,557 | A  |   | 2/1999 | Landru et al. |
| 6,699,943 | B2 | * | 3/2004 | Ramesh et al. ........... 525/329.9 |
| 6,894,113 | B2 |   | 5/2005 | Court et al. |
| 6,913,804 | B2 |   | 7/2005 | Lacroix et al. |
| 2004/0034124 | A1 | * | 2/2004 | Court et al. ................. 523/400 |
| 2006/0142404 | A1 | * | 6/2006 | Berge et al. ................. 521/142 |
| 2007/0100071 | A1 | * | 5/2007 | Bonnet et al. ................. 525/88 |

FOREIGN PATENT DOCUMENTS

| FR | 2841252 | 6/2002 |
| WO | WO03/063572 | 8/2003 |

* cited by examiner

*Primary Examiner*—Jeffrey C Mullis
(74) *Attorney, Agent, or Firm*—Thomas F. Roland

(57) ABSTRACT

The present invention relates to a thermoset material with improved impact resistance comprising, by weight: •99 to 20% of a thermoset resin, •1 to 80% of an impact modifier comprising at least one copolymer chosen from copolymers comprising A-B-C and A-B blocks, in which: each block is connected to the other by means of a covalent bond or of an intermediate molecule connected to one of the blocks via a covalent bond and to the other block via another covalent bond, A is a copolymer of methyl methacrylate and of at least one water-soluble monomer, C is either (i) a PMMA (homopolymer or copolymer) this PMMA comprising optionally a water-soluble monomer or (ii) a polymer based on vinyl monomers or mixture of vinyl monomers, B is incompatible or partially compatible with the thermoset resin and incompatible with the A block and the optional C block and its glass transition temperature Tg is less than the operating temperature of the thermoset material. The invention also relates to the use of these impact modifiers in thermosets.

7 Claims, No Drawings

THERMOSET MATERIALS WITH IMPROVED IMPACT RESISTANCE

This application claims benefit, under U.S.C. §119 or §365 of PCT application PCT/EP2006/000564, filed Jan. 18, 2006; French Applications Number FR 05.00572, filed Jan. 20, 2005, and FR 05.02911 filed Mar. 24, 2005; and U.S. Provisional Application 60/664,137, filed Mar. 22, 2005.

FIELD OF THE INVENTION

The present invention relates to thermoset materials with improved impact resistance. A thermoset material is defined as being formed of polymer chains of variable length bonded to one another via covalent bonds, so as to form a three-dimensional network. Thermoset materials can be obtained, for example, by reaction of a thermosetting resin, such as an epoxy, with a hardener of amine type. Thermoset materials exhibit numerous advantageous properties which allow them to be used as structural adhesives or as a matrix for composite materials or in applications for protecting electronic components. The materials of the invention comprise a thermoset resin and a block copolymer having at least one block predominantly composed of units of methyl methacrylate which is copolymerized with a water-soluble polymer. These materials can be manufactured by dissolution of the copolymer in the thermosetting resin, followed by addition of the hardener and crosslinking under hot conditions.

THE TECHNICAL PROBLEM

The epoxy materials have a high crosslinking density, which provides them with a high glass transition temperature Tg, which confers excellent thermomechanical properties on the material. The higher the crosslinking density, the higher the Tg of the material and consequently the better the thermomechanical properties: the higher the operating temperature limit of the material. Nevertheless, the impact strength properties of epoxy materials are insufficient for numerous applications. Numerous solutions have been developed to attempt to respond to this problem. At the same time, while all epoxy materials are difficult to strengthen with regard to impacts, epoxy materials with high Tg values are the most difficult. Numerous studies have been devoted to the impact strengthening of these epoxy materials with high Tg values and these studies conclude that the addition of rubber to an epoxy material with a high Tg value does not have a strengthening effect. Mention may be made, as examples of such materials, of BADGE/DDS systems (Tg=220° C.), in which DDS denotes diaminodiphenyl sulphone, or BADGE/MCDEA systems (Tg=180° C.), in which MCDEA denotes 4,4'-methylenebis(3-chloro-2,6-diethylaniline). In the preceding materials, BADGE denotes bisphenol A diglycidyl ether.

THE PRIOR ART

The addition of Reactive rubbers (ATBN, CTBN) has been disclosed. These abbreviations mean:
CTBN: Carboxyl-terminated random copolymer of butadiene and acrylonitrile,
ATBN: Amino-terminated random copolymer of butadiene and acrylonitrile.

These products are oligomers based on butadiene and on acrylonitrile which are terminated either by carboxyl functional groups or by amine functional groups. Butadiene has a very low Tg, which is favourable for producing good strengthening with regard to impacts, but it is immiscible with epoxy resins. A certain percentage of acrylonitrile is copolymerized with the butadiene in order for the product formed to be initially miscible with the epoxy resin and thus to be able to be easily incorporated in the latter. P. Lovell (Macromol. Symp. 92, pages 71-81, 1995) and A. Mazouz et al. (Polymer Material Science Engineering, 70, p. 17, 1994) say that, on conclusion of the crosslinking reaction, a portion of the functional oligomer forms elastomer particles and a not insignificant portion remains incorporated in the matrix. This is reflected by a fall in the Tg of the material obtained with respect to the pure epoxy network, which is undesirable for applications requiring good thermomechanical properties. The elastomer domains formed have a large size conventionally of between 0.5 microns and 5 microns. The strengthening obtained is not satisfactory.

For all these reasons, other solutions for the impact strengthening of epoxy networks have been sought. Mention may be made, for example, of P. Lovell (Macromol. Symp. 92, pages 71-81, 1995), who establishes that strengthening with preformed core-shell particles leads to better results.

As regards strengthening with preformed core-shell particles: these are preformed particles with an elastomer core, with a glass transition temperature of less than −20° C., and a rigid shell, with a glass transition temperature of greater than 50° C., which may or may not carry reactive functional groups. A reactive functional group is defined as a chemical group capable of reacting with the oxirane functional groups of epoxy molecules or with the chemical groups of the hardener. Mention may be made, as non-limiting examples of reactive functional groups, of: oxirane functional groups, amine functional groups or carboxyl functional groups. These particles of well defined size are added to the reactants (epoxy and hardener). After reaction, the material formed is characterized by a dispersion of these particles within the thermoset matrix. The elastomer particles in the material obtained have the same size as at the start, before the reaction. This result is well known; mention may be made, as examples of the prior art describing it, of, for example, the article by Maazouz et al., Polymer Bulletin 33, pages 67-74, 1994, and by Sue et al., Rubber-Toughened Plastics, 1993, pages 259-291 (cf. page 261).

These preformed particles are obtained by a two-stage emulsion synthesis; the elastomer core is synthesized during the first stage and the shell is grafted onto the core during the second stage. This synthetic process results in particles with a core size varying between 30 nanometers and 2 microns (Sue et al., Rubber-Toughened Plastics, 1993, pages 259-291 (cf. page 261)). Numerous studies have been devoted to determining the size of the elastomer core of the particle for producing optimum impact strengthening. These studies show that, with preformed particles, satisfactory strengthening can only be obtained for particle sizes of greater than 120 nanometers.

Given the size of the elastomer domains in the material obtained, the latter is not transparent. This opaqueness is an impediment in some applications. This is the case, for example, with applications of thermoset materials in composites where the manufacturer wishes to be able to visually observe the quality of his structure (thermoset material+fibres or thermoset material+fillers). Mention may also be made of the example of electronic applications of epoxy materials; the opaqueness of the material is harmful as it is an impediment to the user.

The prior art has also described the addition of a PEO-PEE Diblock: Hillmyer et al. (M. A. Hillmyer, P. M. Lipic, D. A. Hajduk, K. Almdal, F. S. Bates, Journal of the American Chemical Society, 1997, 119, 2749-2750) have carried out studies on mixtures of a thermosetting epoxy/phthalic anhydride system and of an A-B diblock, where A is poly(ethylene oxide) and B is poly(ethylethylene), PEO-PEE. These authors have shown that the material obtained is characterized by a very specific morphology. It is composed of a thermoset matrix in which are evenly distributed PEE cylinders all having the same diameter of 5 to 10 nanometers, the cylinders themselves being surrounded by a shell (or by a sheath) of PEO with a thickness of a few nanometers. The authors found that the materials obtained were transparent but they did not study their properties nor allude to the properties which they might exhibit.

The addition of a PEO-PEP diblock to a BADGE-MDA system has also been described (Lipic P M, Bates F S and Hillmyer M A, Journal of the American Chemical Society, 1998, 120, 8963-8970); MDA denotes methylenediamine. The studies and the results are equivalent to those in the preceding paragraph.

The addition of a Polysiloxane-Polycaprolactone block copolymer has also been described: PCL-b-PDMS-b-PCL and $(PCL)_2$-b-PDMS-b-$(PCL)_2$. Könczol et al. (Journal of Applied Polymer Science, vol. 54, pages 815-826, 1994) have studied blends between an epoxy/anhydride system and a PCL-b-PDMS-b-PCL or $(PCL)_2$-b-PDMS-b-$(PCL)_2$ multiblock copolymer, where PCL denotes polycaprolactone and PDMS polydimethylsiloxane. The authors show that the material obtained is transparent and that the addition of 5% to 15% of copolymer makes possible a significant improvement in the impact strength of the epoxy material.

The prior art also refers to the use of block copolymers in compatibilizing thermoplastic/thermoset systems. Thus, Girard-Reydet et al., Polymer, 1999, No. 40, page 1677, have studied thermoplastic/thermoset blends where the thermoplastic is either PPE (polyphenylene ether) or PEI (polyetherimide) and the thermoset system is the BADGE/MCDEA pair. These blends are brittle. The authors have found that the use of a maleized copolymer comprising SEBS blocks, modified beforehand by reaction with a monoamine or a diamine (such as MCDEA), made it possible to improve the impact strength of the thermoplastic/thermoset blend.

Patent application WO 01/92415 discloses a thermoset material with improved impact resistance comprising:
  99 to 20% of a thermoset resin,
  1 to 80% of an impact modifier comprising at least one copolymer chosen from copolymers comprising S-B-M, B-M and M-B-M blocks, in which:
    each block is connected to the other by means of a covalent bond or of an intermediate molecule connected to one of the blocks via a covalent bond and to the other block via another covalent bond,
  M is a PMMA homopolymer or a copolymer comprising at least 50% by weight of methyl methacrylate,
  B is incompatible with the thermoset resin and with the M block and its glass transition temperature Tg is less than the operating temperature of the thermoset material,
  S is incompatible with the thermoset resin, the B block and the M block and its Tg or its melting temperature M.t. is greater than the Tg of B.

Advantageously, the B block is either polybutadiene or poly(butyl acrylate) and the S block is polystyrene.

The addition of these block copolymers having at least one block predominantly composed of methyl methacrylate units to thermoset materials results in thermoset materials with improved impact resistance. Furthermore, these materials remain transparent and the Tg is maintained or is not lowered by more than 12° C. It is possible, in addition to the block copolymer predominantly composed of methyl methacrylate units, to add other block copolymers or impact modifiers, such as core-shells or functionalized elastomers. Depending on the nature of these modifiers added in addition, the material may not remain transparent but the impact strength is very greatly improved. However, it has been found that, if the blocks based on methyl meth-acrylate units comprise a water-soluble monomer, then the thermoset material is easier to produce.

BRIEF DESCRIPTION OF THE INVENTION

The present invention relates to a thermoset material with improved impact resistance comprising, by weight:
  99 to 20% of a thermoset resin,
  1 to 80% of an impact modifier comprising at least one copolymer chosen from copolymers comprising A-B-C and A-B blocks, in which:
  each block is connected to the other by means of a covalent bond or of an intermediate molecule connected to one of the blocks via a covalent bond and to the other block via another covalent bond,
  A is a copolymer of methyl methacrylate and of at least one water-soluble monomer,
  C is either (i) a PMMA (homopolymer or copolymer) this PMMA comprising optionally a water-soluble monomer or (ii) a polymer based on vinyl monomers or mixture of vinyl monomers,
  B is incompatible or partially compatible with the thermoset resin and incompatible with the A block and the optional C block and its glass transition temperature Tg is less than the operating temperature of the thermoset material.

The invention also relates to the use of these impact modifiers in thermosets.

DETAILED DESCRIPTION OF THE INVENTION

As regards the thermoset material, it is defined as being formed of polymer chains of variable length bonded to one another via covalent bonds, so as to form a three-dimensional network.

Mention may be made, by way of examples, of unsaturated polyesters resins, polyacrylics, polyurethanes, cyanoacrylates, bismaleimides and epoxy resins crosslinked by a hardener.

Mention may be made, among cyanoacrylates, of 2-cyanoacrylic esters, which are thermoset materials obtained by polymerization of the monomer $CH_2$=C(CN)COOR with various possible R groups (without requiring the addition of a hardener).

The thermoset formulations of bismaleimide type are, for example:

methylenedianiline+benzophenone dianhydride+nadic imide methylenedianiline+benzophenone dianhydride+phenylacetylene methylenedianiline+maleic anhydride+maleimide.

The thermoset material advantageously originates from the reaction of a thermosetting epoxy resin and of a hardener. It is also defined as any product from the reaction of an oligomer carrying oxirane functional groups and of a hardener. The reactions involved during the reaction of these epoxy resins result in a crosslinked material corresponding to a three-dimensional network which is more or less dense according to the basic characteristics of the resins and hardeners employed.

The term "epoxy resin", hereafter denoted by E, is understood to mean any organic compound having at least two functional groups of oxirane type which can be polymerized by ring opening. The term "epoxy resins" denotes any conventional epoxy resin which is liquid at room temperature (23° C.) or at a higher temperature. These epoxy resins can be monomeric or polymeric, on the one hand, aliphatic, cycloaliphatic, heterocyclic or aromatic, on the other hand. Mention may be made, as examples of such epoxy resins, of resorcinol diglycidyl ether, bisphenol A diglycidyl ether, triglycidyl-p-amino-phenol, bromobisphenol F diglycidyl ether, the triglycidyl ether of m-amino-phenol, tetraglycidylmethylenedianiline, the triglycidyl ether of (trihydroxy-phenyl)methane, polyglycidyl ethers of phenol-formaldehyde novolak, poly-glycidyl ethers of ortho-cresol novolak and tetraglycidyl ethers of tetraphenyl-ethane. Mixtures of at least two of these resins can also be used.

Epoxy resins having at least 1.5 oxirane functional groups per molecule or more particularly epoxy resins comprising between 2 and 4 oxirane functional groups per molecule are preferred. Epoxy resins having at least one aromatic ring, such as bisphenol A diglycidyl ethers, are also preferred.

As regards the hardener, use is generally made, as hardeners, of hardeners for epoxy resins which react at room temperature or at temperatures higher than room temperature. Mention may be made, as non-limiting examples, of:

- acid anhydrides, including succinic anhydride,
- aromatic or aliphatic polyamines, including diaminodiphenyl sulphone (DDS), methylenedianiline, 4,4'-methylenebis(3-chloro-2,6-diethyl-aniline) (MCDEA) or 4,4'-methylenebis(2,6-diethylaniline) (M-DEA),
- dicyandiamide and its derivatives,
- imidazoles,
- polycarboxylic acids,
- polyphenols.

As regards the A-B diblock, A is a copolymer of methyl methacrylate and of at least one water-soluble monomer. Mention may be made, as examples of water-soluble monomers, of acrylic or methacrylic acid, the amides derived from these acids, such as, for example, dimethylacrylamide, 2-methoxy-ethyl acrylate or methacrylate, 2-aminoethyl acrylates or methacrylates which are optionally quaternized, polyethylene glycol (PEG) (meth)acrylates, water-soluble vinyl monomers, such as N-vinylpyrrolidone, or any other water-soluble monomer. Advantageously, the polyethylene glycol group of the polyethylene glycol (meth)acrylates has a mass ranging from 400 g/mol to 10,000 g/mol.

The proportion of MMA can be, by moles, from 10 to 95% for 90 to 5% of water-soluble monomer. Preferably, the proportion of MMA is, by moles, from 60 to 90% for 40 to 10% of water-soluble monomer. The A block can comprise other monomers which can be acrylic monomers. These monomers may be reactive. The term "reactive monomer" is understood to mean: a chemical group capable of reacting with the oxirane functional groups of the epoxy molecules or with the chemical groups of the hardeners. Mention may be made, as non-limiting examples of reactive functional groups, of: oxirane functional groups, amine functional groups or carboxyl functional groups. The reactive monomer can be (meth)acrylic acid or any other hydrolysable monomer resulting in these acids. Mention may be made, among the other monomers which can constitute the A block, as non-limiting examples, of glycidyl methacrylate or tert-butyl methacrylate.

As regards B, the Tg of B is advantageously less than 0° C. and preferably less than −40° C.

The monomer used to synthesize the elastomeric B block can be a diene chosen from butadiene, isoprene, 2,3-dimethyl-1,3-butadiene, 1,3-pentadiene or 2-phenyl-1,3-butadiene. B is advantageously chosen from poly(dienes), in particular poly(butadiene), poly(isoprene) and their random copolymers, or from partially or completely hydrogenated poly(dienes). Use is advantageously made, among polybutadienes, of those with the lowest Tg, for example 1,4-polybutadiene with a Tg (approximately −90° C.) lower than that of 1,2-polybutadiene (approximately 0° C.). The B blocks can also be hydrogenated. This hydrogenation is carried out according to the usual techniques.

The monomer used to synthesize the elastomeric B block can also be an alkyl(meth)acrylate. The following Tg values (between brackets following the name of the acrylate) are obtained: ethyl acrylate (−24° C.), butyl acrylate (−54° C.), 2-ethylhexyl acrylate (−85° C.), hydroxyethyl acrylate (−15° C.) and 2-ethylhexyl methacrylate (−10° C.). Butyl acrylate is advantageously used. The acrylates are different from those in the A block in order to observe the condition that B and A are incompatible.

The B blocks are preferably predominantly composed of 1,4-polybutadiene.

The A-B diblock has a number-average molar mass which can be between 10,000 g/mol and 500,000 g/mol, preferably between 20,000 and 200,000 g/mol. The A-B diblock is advantageously composed of a fraction by mass of A of between 5 and 95% and preferably between 15 and 85%.

As regards the A-B-C triblock, C is either (i) a PMMA (homopolymer or copolymer) this PMMA comprising optionally a water-soluble monomer or (ii) a polymer based on vinyl monomers or mixture of vinyl monomers.

As regards (i), the monomers and optionally comonomers of the C block are chosen from the same family of monomers and optionally comonomers as those of the A block of the A-B diblock. However, the presence of the water-soluble monomer is not obligatory. By way of example C can be either a PMMA homopolymer, either a PMMA copolymer (by way of example a copolymer of MMA and another acrylate such as methyl acrylate or ethyl acrylate), either a copolymer of MMA, a water-soluble monomer and optionally another monomer. The two A and C blocks of the A-B-C triblock can be identical or different. They may also be different in their molar masses but composed of the same monomers. If the C block comprises a water-soluble monomer, it can be identical to or different from the water-soluble monomer of the A block.

As regards (ii), mention may be made, as examples of C blocks, of those which derive from vinylaromatic compounds, such as styrene, α-methylstyrene or vinyltoluene, and those which derive from alkyl esters of acrylic and/or methacrylic acids having from 1 to 18 carbon atoms in the alkyl chain.

The B block is composed of the same monomers and optionally comonomers as the B block of the A-B diblock. The B blocks of the A-B-C triblock and of the A-B diblock can be identical or different.

The A-B-C triblock has a number-average molar mass which can be between 10,000 g/mol and 500,000 g/mol, preferably between 20,000 and 200,000 g/mol. Advantageously, the A-B-C triblock has the following compositions, expressed as fraction by mass, the total being 100%:

A+C: between 10 and 80% and preferably between 15 and 70%,

B: between 90 and 20% and preferably between 85 and 30%.

These copolymers A-B-C and A-B can be manufactured by any polymerization means and in particular by controlled radical polymerization. Controlled radical polymerization is known. Conventional radical polymerizations do not make possible access to polymers and copolymers possessing controlled architecture due in particular to the low lifetimes of the radicals, to their high reactivity and to the lack of stereochemistry of the intermediate entities. The term "controlled radical polymerization" is understood to mean a conventional radical polymerization in which at least one of the stages chosen from initiation, propagation, termination and transfer is controlled. Mention may be made, as example of control, of the reversible deactivation of the growing macroradicals. This reversible deactivation can be brought about by the addition of nitroxides to the reaction medium. A persistent radical is, for example, TEMPO (2,2,6,6-tetramethyl-1-piperidinyloxy), which captures the macroradicals and generally results in homopolymers of very narrow polydispersities, thus conferring a living nature on the radical polymerization. Mention may also be made of p-phosphorylated molecules possessing a hydrogen in the alpha position with respect to the nitroxide functional group.

As regards the proportions of the thermoset resin and of the impact modifier, the proportion of the impact modifier is advantageously from 5 to 20% by weight for 95 to 80% of thermoset resin. Preferably, the proportion of the impact modifier is from 5 to 15% by weight for 95 to 85% of thermoset resin.

The materials of the invention can be prepared by blending the thermoset resin, not yet crosslinked, and the block copolymer using a conventional blending device.

As regards the epoxy resins, the materials of the invention can be prepared using a conventional stirred reactor. The thermosetting epoxy resin is introduced into the reactor and brought for a few minutes to a temperature sufficient to be fluid. The block copolymer is subsequently added and kneaded at a temperature sufficient to be fluid until it has completely dissolved. The kneading time depends on the nature of the copolymer added. The hardener is then added and blending is carried out for a further 5 minutes at a temperature sufficient to be fluid in order to obtain a homogeneous blend. The epoxy-hardener reaction begins during this blending and it must therefore be arranged to be as short as possible. These blends are subsequently cast and cured in a mould.

Curing Conditions:

These are the usual conditions.

It would not be departing from the scope of the invention to add the usual additives to the thermoset materials.

EXAMPLES

The following products were used:

Epoxy resin: various epoxide prepolymers were used:

a bisphenol A diglycidyl ether (BADGE) with a molar mass of 383 g/mol, with a mean number of hydroxyl groups per one epoxy group of n=0.075, sold by the company Huntsman under the commercial reference LY556, tetraglycidylmethylenedianiline (TGDDM) with a mass of 422 g/mol, sold by the company Vantico.

Hardeners:

An amine hardener which is an aromatic diamine, 4,4'-methylenebis-(2,6-diethylaniline), sold by the company Lonza under the commercial reference Lonzacure M-DEA. This product is characterized by a melting point of between 87° C. and 90° C. and a molar mass of 380 g/mol.

An amine hardener which is an aromatic diamine, diaminodiphenyl sulphone (DDS) with a mass of 248 g/mol, sold by the company Aldrich.

An aliphatic amine hardener of Jeffamine T403 type, sold by the company Huntsman, with a mass of 400 g/mol.

Impact Modifiers

SBM: it is an S-B-M triblock copolymer in which S is polystyrene, B is polybutadiene and M is PMMA, comprising 24% as fraction by mass of polystyrene, 26% as fraction by mass of polybutadiene and 50% by mass of poly(methyl methacrylate), obtained by anionic polymerization successively of a polystyrene block with a number-average molar mass of 21,000 g/mol, of a polybutadiene block with a mass of 22,000 g/mol and of a poly(methyl methacrylate) block with a number-average molar mass of 43,000 g/mol. This product was prepared according to the procedure disclosed in EP 524,054 and in EP 749,987. This product exhibits three glass transitions, one of −90° C., another of 95° C. and the third of 130° C.

MBuAM-1: it is a triblock copolymer in which M is PMMA and BuA is a butyl acrylate homopolymer. This copolymer can also be denoted by A-B-C, in which the A and C blocks are identical and are PMMA and the B block is a butyl acrylate homopolymer. This copolymer is obtained by controlled radical polymerization. The number-average molar mass of the butyl acrylate is 22,000 g/mol and the weight-average molar mass of the complete copolymer is 140,000 g/mol.

MBuAM-2: it is an A-B-C triblock copolymer in which M is a copolymer of methyl methacrylate (MMA) and of dimethylacrylamide (DMA) with a molar ratio of 80% of MMA and of 20% of DMA. This copolymer can also be denoted by A-B-C, in which the A and C blocks are identical and are copolymers of methyl methacrylate (MMA) and of dimethyl acrylamide (DMA) and the B block is a butyl acrylate homopolymer.

Curing Conditions:

The blends comprising 10% of additives are precured for 14 hours at 135° C. and postcured for 4 hours at 220° C.

Measurement of the Impact Strengthening—Measurement of KIC

The KIC was measured at room temperature on notched three-point bending samples according to the procedure provided by Williams and Cawood (Polymer Testing, 9 (1990), 15-26). The test specimens are prenotched with a diamond saw. A finer crack is produced on the samples, clamped in a vice, using a razor blade, the razor blade being given a gentle tap which leads to cracking. This makes it possible to obtain a very fine crack root, similar to a natural crack. The total depth of the notch is measured using a binocular magnifier.

Measurement of the Glass Transition Temperature Tg by Thermomechanical Analysis:

Tg was measured by dynamic mechanical analysis on post-cured samples using a Rheometrics device (Rheometrics Solid Analyser, RSAII). The samples, which are parallelepipedal in shape ($1 \times 2.5 \times 34$ mm$^3$), are subjected to a temperature sweep between 50 and 250° C. at a stress frequency of 1 Hz. The glass transition temperature is taken at the maximum of tan δ.

Swelling Measurement:

A sample with a parallelepipedal shape, with dimensions of $20 \times 20 \times 1$ mm, is placed in a 100 ml beaker filled with toluene for a duration of 15 days. The beaker is kept hermetically sealed at room temperature. After immersion for 15 days, the sample is removed and its mass is monitored. The percentage of swelling is obtained by the following equation:

$$\% \text{ swelling} = [m(15 \text{ days}) - m(\text{initial})]/m(\text{initial})$$

The sample is subsequently dried and weighed again in order to monitor that none of the constituents of the material has been dissolved by the toluene.

Example 1

Comparative

A blend based on BADGE-DDS comprising 10% of SBM is prepared according to the blending protocol described above. The results are listed in Table 1.

Example 2

Comparative

A blend based on BADGE-DDS comprising 10% of MBuAM-1 is prepared according to the blending protocol described above. The results are listed in Table 1.

Example 3

According to the Invention

A blend based on BADGE-DDS comprising 10% of MBuAM-2 is prepared according to the blending protocol described above. The results are listed in Table 1.

Example 4

Comparative

A blend based on TGDDM-MDEA comprising 10% of MBuAM-1 is prepared according to the blending protocol described above. The results are listed in Table 1.

Example 5

According to the Invention

A blend based on TGDDM-MDEA comprising 10% of MBuAM-2 is prepared according to the blending protocol described above. The results are listed in Table 1.

Example 6

Comparative

A blend based on BADGE-Jeffamine T403 comprising 10% of MBuAM-1 is prepared according to the blending protocol described above. The results are listed in Table 1.

Example 7

According to the Invention

A blend based on BADGE-Jeffamine T403 comprising 10% of MBuAM-2 is prepared according to the blending protocol described above. The results are listed in Table 1.

TABLE 1

| Number of the example | Nature of the base resin | Nature of the copolymer | KIC | Tg | Transparency | Observations |
| --- | --- | --- | --- | --- | --- | --- |
| 1 | BADGE-DDS | SBM | 0.74 | 220° C. | no | |
| 2 | BADGE-DDS | MBuAM-1 | 0.74 | 219° C. | no | |
| 3 | BADGE-DDS | MBuAM-2 | 1.1 | 215° C. | yes | |
| 4 | TGDDM-MDEA | MBuAM-1 | — | 235° C. | | no dissolution |
| 5 | TGDDM-MDEA | MBuAM-2 | 1 | 230° C. | yes | |
| 6 | BADGE-T403 | MBuAM-1 | 3 | 70° C. | no | |
| 7 | BADGE-T403 | MBuAM-2 | 4 | 72° C. | yes | |

The References:

The unmodified BADGE-DDS system exhibits a Tg of 220° C. and a KIC of 0.55 MPa·m$^{1/2}$.

The unmodified TGDDM-MDEA system exhibits a Tg of 235° C. and a KIC of 0.5 MPa·m$^{1/2}$.

The unmodified BADGE-Jeffamine T403 system exhibits a Tg of 70° C. and a KIC of 1.1 MPa·m$^{1/2}$.

The invention claimed is:

1. Thermoset material with improved impact resistance comprising, by weight:
   95 to 85% of a thermoset resin,
   5 to 15% of an impact modifier comprising at least one copolymer chosen from copolymers comprising A-B-C and A-B blocks, in which:
   each block is connected to the other by means of a covalent bond or of an intermediate molecule connected to one of the blocks via a covalent bond and to the other block via another covalent bond,
   A is a copolymer of methyl methacrylate (MMA) and dimethylacrylamide (DMA),
   C is either (i) a polymethyl methacrylate (PMMA) (homopolymer or a copolymer) this PMMA comprising optionally a water-soluble monomer or (ii) a polymer based on vinyl monomers or mixture of vinyl monomers,
   B is incompatible or partially compatible with the thermoset resin and incompatible with the A block and the optional C block and the Tg of B is less than 0° C.

2. Material according to claim 1, in which in A, the proportion of MMA is, in moles, from 10 to 95% for 90 to 5% of dimethylacrylamide (DMA).

3. Material according to claim 2, in which in A the proportion of MMA is, in moles, from 60 to 90% for 40 to 10% of dimethylacrylamide (DMA).

4. Material according to claim 1, in which the Tg of B is less than −40° C.

5. Material according to claim 1, in which B is selected from the group consisting of polybutadiene and poly(butyl acrylate).

6. Material according to claim 1, wherein blocks A and C are identical.

7. Material according to claim 1, wherein block A is a copolymer of MMA and of DMA with a molar ratio of 80% MMA and 20% DMA.

* * * * *